United States Patent
Maimone et al.

(10) Patent No.: US 9,594,247 B2
(45) Date of Patent: Mar. 14, 2017

(54) SYSTEM, METHOD, AND COMPUTER PROGRAM PRODUCT FOR A PINLIGHT SEE-THROUGH NEAR-EYE DISPLAY

(71) Applicant: NVIDIA Corporation, Santa Clara, CA (US)

(72) Inventors: Andrew Stephen Maimone, Durham, NC (US); Douglas Robert Lanman, Sunnyvale, CA (US); David Patrick Luebke, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 380 days.

(21) Appl. No.: 14/134,637

(22) Filed: Dec. 19, 2013

(65) Prior Publication Data

US 2015/0177514 A1   Jun. 25, 2015

(51) Int. Cl.
  *G02B 27/09* (2006.01)
  *G02B 27/01* (2006.01)
  *G02B 27/22* (2006.01)

(52) U.S. Cl.
  CPC .... *G02B 27/0101* (2013.01); *G02B 2027/014* (2013.01); *G02B 2027/015* (2013.01); *G02B 2027/0123* (2013.01)

(58) Field of Classification Search
  CPC .... G02B 27/01; G02B 27/0101; G02B 27/02; G02B 27/22; G02B 27/2214; G02B 2027/014; G02B 2027/0123; G02B 2027/015; G09G 3/00
  USPC ................... 345/690, 694, 8; 348/42, 51, 53
  See application file for complete search history.

(56) References Cited

U.S. PATENT DOCUMENTS

| | | | | |
|---|---|---|---|---|
| 5,499,138 A | * | 3/1996 | Iba | G02B 3/0043 345/8 |
| 5,751,383 A | * | 5/1998 | Yamanaka | G02B 27/026 349/13 |
| 5,883,606 A | * | 3/1999 | Smoot | G02B 27/017 345/7 |
| 6,097,394 A | | 8/2000 | Levoy et al. | |
| 6,160,667 A | * | 12/2000 | Smoot | G02B 27/0172 345/7 |

(Continued)

FOREIGN PATENT DOCUMENTS

| CN | 102402011 A | 4/2012 |
|---|---|---|
| CN | 102411210 A | 4/2012 |

(Continued)

OTHER PUBLICATIONS

U.S. Appl. No. 13/720,809, filed Dec. 19, 2012.

(Continued)

*Primary Examiner* — Julie Anne Watko
(74) *Attorney, Agent, or Firm* — Zilka-Kotab, PC

(57) ABSTRACT

A system, method, and computer program product are provided for implementing a pinlight see-through near-eye display. Light cones configured to substantially fill a field-of-view corresponding to a pupil are generated by an array of pinlights positioned between a near focus plane and the pupil. Overlap regions where two of more light cones intersect at a display layer positioned between the array of pinlights and the pupil are determined. The two or more light cones are modulated based on the overlap regions to produce a target image at or beyond the near focus plane.

18 Claims, 13 Drawing Sheets

(56) References Cited

U.S. PATENT DOCUMENTS

| | | | |
|---|---|---|---|
| 6,215,593 B1* | 4/2001 | Bruce | G02B 6/08 359/619 |
| 7,667,783 B2* | 2/2010 | Hong | G02B 3/14 349/11 |
| 8,724,039 B2* | 5/2014 | Huang | G02B 27/2214 349/106 |
| 9,217,872 B2* | 12/2015 | Niioka | G02B 27/22 |
| 9,275,303 B2* | 3/2016 | Cvetkovic | G09C 5/00 |
| 9,406,166 B2* | 8/2016 | Futterer | G02B 5/32 |
| 9,519,144 B2 | 12/2016 | Lanman et al. | |
| 2004/0150583 A1* | 8/2004 | Fukushima | H04N 13/0409 345/6 |
| 2005/0099689 A1* | 5/2005 | Fukushima | G02B 27/22 359/466 |
| 2005/0264881 A1* | 12/2005 | Takagi | H04N 13/0404 359/463 |
| 2005/0280894 A1* | 12/2005 | Hartkop | H04N 13/0409 359/464 |
| 2006/0125916 A1* | 6/2006 | Mashitani | G02B 27/2214 348/51 |
| 2006/0227067 A1 | 10/2006 | Iwasaki | |
| 2007/0126657 A1 | 6/2007 | Kimpe | |
| 2010/0271467 A1* | 10/2010 | Akeley | H04N 13/0406 348/59 |
| 2012/0026583 A1* | 2/2012 | Kuwayama | G02B 27/2214 359/462 |
| 2012/0057228 A1 | 3/2012 | Okamoto | |
| 2012/0212399 A1 | 8/2012 | Border et al. | |
| 2013/0082905 A1 | 4/2013 | Ranieri et al. | |
| 2013/0107024 A1* | 5/2013 | Akeley | H04N 13/0406 348/59 |
| 2013/0120605 A1 | 5/2013 | Georgiev et al. | |
| 2014/0049666 A1 | 2/2014 | Tsutsumi | |
| 2014/0168034 A1 | 6/2014 | Luebke et al. | |
| 2014/0168035 A1 | 6/2014 | Luebke et al. | |
| 2014/0168783 A1 | 6/2014 | Luebke et al. | |
| 2014/0340389 A1* | 11/2014 | Lanman | G06T 15/04 345/419 |
| 2014/0340390 A1 | 11/2014 | Lanman et al. | |
| 2015/0130995 A1 | 5/2015 | Nishiyama et al. | |
| 2015/0319430 A1* | 11/2015 | Lapstun | H04N 13/0402 348/51 |
| 2016/0026253 A1* | 1/2016 | Bradski | G02B 6/34 345/8 |
| 2016/0033771 A1* | 2/2016 | Tremblay | G02B 27/0172 345/8 |

FOREIGN PATENT DOCUMENTS

| | | | |
|---|---|---|---|
| JP | 2011145607 A * | 7/2011 | |
| JP | 2012053342 A | 3/2012 | |
| WO | WO 2014186625 A1 * | 11/2014 | G06T 15/04 |

OTHER PUBLICATIONS

U.S. Appl. No. 13/720,831, filed Dec. 19, 2012.
U.S. Appl. No. 13/720,842, filed Dec. 19, 2012.
U.S. Appl. No. 14/323,965, filed Jul. 3, 2014.
U.S. Appl. No. 14/160,497, filed Jan. 21, 2014.
Wetzstein, G. et al., "Tensor Displays: Compressive Light Field Synthesis Using Multilayer Displays with Directional Backlighting," ACM Transactions on Graphics SIGGRAPH 2012 Conference Proceedings, vol. 31, Issue 4, Jul. 2012, pp. I-II.
International Search Report and Written Opinion from International Application No. PCT/US2014/038270, dated Oct. 10, 2014.
Son, J.-Y. et al., "3D displays using light from an undiffused point-source array," SPIE Newsroom, 10.1117/2.1200902.1414, Feb. 13, 2009, pp. 1-2.
"Dimension Technologies Inc.—Virtual Window 19," retrieved from www.dti3d.com/component/page,shop.product_details/flypage,flypage_images.tpl/product_id,27/category_id,1/option,com_virtuemart/Itemid,94/ on Dec. 15, 2013.
Maimone, A. et al., "Computational Augmented Reality Eyeglasses," Proceeding from International Symposium on Mixed and Augmented Reality, Oct. 1-4, 2013, pp. 1-10.
Son, J.-Y. et al., "Three-dimensional imaging system based on a light-emitting diode array," Optical Engineering, vol. 46, No. 10, Oct. 2007, pp. 103205/1-103205/4.
Lanman, D., et al., "Near-Eye Light-Field Displays," ACM Transactions on Graphics (TOG), Proceedings of SIGGRAPH Asia, vol. 32, Issue 6, Nov. 2013, pp. 1-10.
Non-Final Office Action from U.S Appl. No. 14/323,965, dated Mar. 16, 2016.
Pamplona, V. F. et al., "Tailored displays to compensate for visual aberrations," ACM Trans. Graph 31.4, 2012, 12 pages.
Son, J.-Y. et al., "30 displays using light from an undiffused point-source array," SPIE Newsroom, 10.1117/2.1200902.1414, Feb. 2009, pp. 1-2.
Non-Final Office Action from U.S Appl. No. 14/160,497, dated Oct. 29, 2015.
Non-Final Office Action from U.S Appl. No. 14/160,497, dated Jun. 2, 2016.
Notice of Allowance from U.S. Appl. No. 14/323,965, dated Jul. 29, 2016.
Advisory Action from U.S. Appl. No. 14/160,497, dated Aug. 17, 2016.
Notice of Allowance from U.S. Appl. No. 14/160,497, dated Sep. 28, 2016.
Office Action from Chinese Patent Application No. 201480028202.5, dated Jan. 10, 2017.

* cited by examiner

SYSTEM, METHOD, AND COMPUTER PROGRAM PRODUCT FOR A PINLIGHT SEE-THROUGH NEAR-EYE DISPLAY

FIELD OF THE INVENTION

The present invention relates to a display, and more specifically to a pinlight see-through near-eye display.

BACKGROUND

Conventional optical see-through near-eye displays that have been incorporated into an eyeglass-type of apparatus, such as Google Glass®, are limited to a narrow field of view. When wearing Google Glass®, a viewer sees a synthetic image overlaid onto a real-world scene within a field of view that is typically less than 20 degrees. To provide a viewer with a satisfactory augmented reality experience, where an image is overlaid onto a scene viewed through a pair of eyeglass-type apparatus, the field of view should be greater than 40 degrees.

Optical see-through near-eye displays having a field of view greater than 40 degrees have been constructed using freeform optics, waveguides, or beam splitters to superimpose a synthetic image over a scene. However, displays constructed using these mechanisms are bulky and uncomfortable to wear when incorporated into an eyeglass-type apparatus. Thus, there is a need for addressing this issue and/or other issues associated with the prior art.

SUMMARY

A system, method, and computer program product are provided for implementing a pinlight see-through near-eye display, where a pinlight is a point light source. Light cones configured to substantially fill a field-of-view corresponding to a pupil are generated by an array of pinlights positioned between a near focus plane and the pupil. Overlap regions where two or more light cones intersect at a display layer positioned between the array of pinlights and the pupil are determined. The two or more light cones are modulated based on the overlap regions to produce a target image at or beyond the near focus plane.

DETAILED DESCRIPTION

Figure 1:
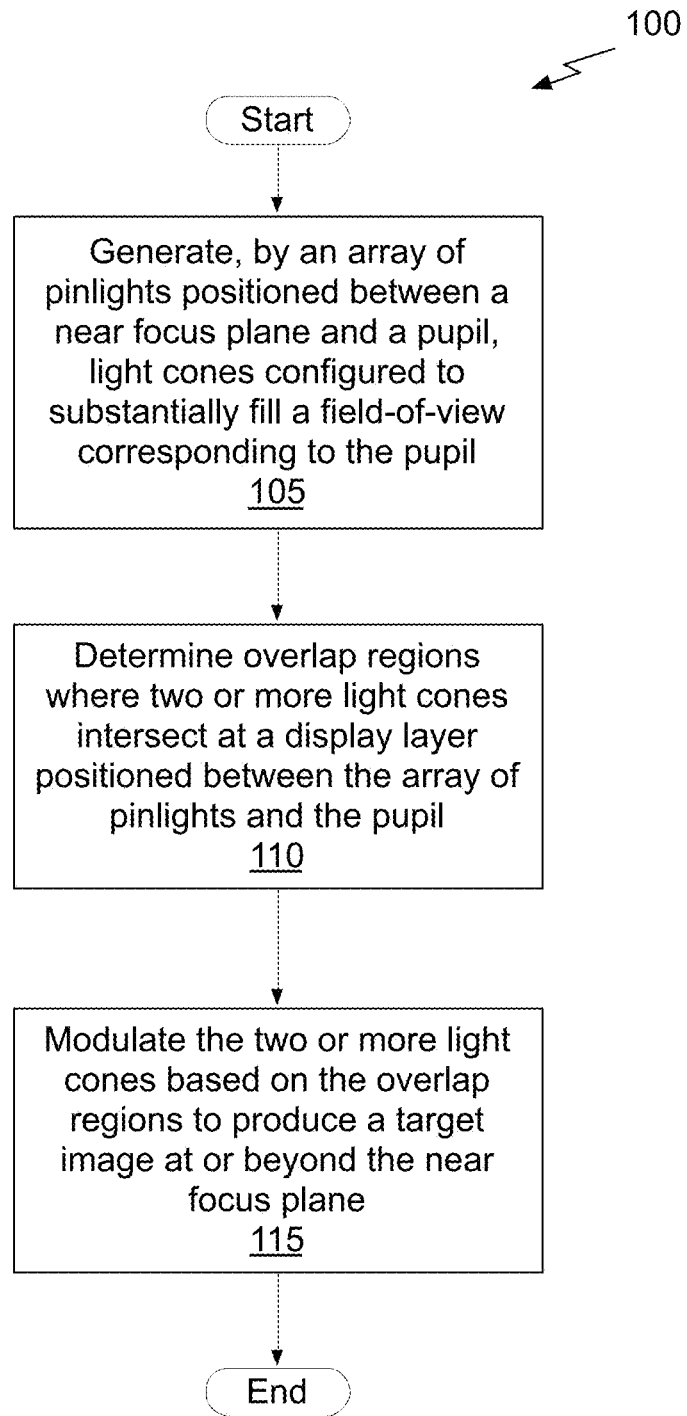
FIG. 1 illustrates a flowchart of a method for implementing a pinlight see-through near-eye display, in accordance with one embodiment.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "displaying," "generating," "producing," "calculating," "determining," "radiating," "emitting," "attenuating," "modulating," "transmitting," "receiving," or the like, refer to actions and processes (e.g., flowcharts 100 and 600 of FIGS. 1 and 6) of a computer system or similar electronic computing device or processor (e.g., computing system 710 of FIG. 7). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

A pinlight see-through near-eye display may provide a field of view that is greater than 20 degrees and is, therefore, able to provide a satisfactory augmented reality experience where a synthetic image is overlaid onto a scene viewed through an eyeglass-type apparatus. However, a pinlight see-through near-eye display having only a single pinlight may be used to provide an augmented reality experience with utility for applications that do not require a wide field of view (e.g., greater than 20 degrees). The pinlight see-through near-eye display combines a pinlight array including at least one pinlight and a compact optical see-through display to produce the synthetic image in a viewer's field of view, even when placed so close that the viewer's eyes cannot accommodate in terms of focusing (i.e., the optical see-through display is placed closer than the near focus plane). In the context of the following description, a near focus plane is a distance from the pupil where objects appear in focus to a viewer. Objects that are closer than the near focus plane do not appear in focus and objects at the near focus plane or beyond the near focus plane may appear in focus to a viewer up to a "far" focus plane. The location of the far focus plan varies depending on a viewer's optical prescription in each eye.

FIG. 1 illustrates a flowchart of a method 100 for implementing a pinlight see-through near-eye display, in accordance with one embodiment. At step 105, light cones configured to substantially fill a field-of-view corresponding to a pupil of a viewer are generated by an array of pinlights positioned between a near focus plane and the pupil. In the context of the following description, a pinlight is a small light source that may be as small as a few microns in diameter (i.e., a point light source) and should have an angle of emission that encompasses all expected diameters, orientations (i.e., rotations), and positions of the pupil. In one embodiment, an eyebox defines a field-of-view corresponding to a pupil, where the eyebox encompasses all expected diameters, orientations (i.e., rotations), and positions of the pupil. The pupil is an aperture through which light reaches the retina. While a pinlight may emit light rays in many directions, only the light rays that pass through the pupil can be seen by the viewer. In the context of the following description, a light cone is a volume represented by a projection of a pinlight onto the pupil that terminates at the pupil to form a circular base of the light cone. In other words, a geometry of the light cone is defined by the shape of the pupil projected to a single pinlight. While light rays emitted by a pinlight are not constrained to form a light cone, the light rays that are within the light cone can be seen by the viewer (i.e., reach the pupil).

At step 110, overlap regions where two or more light cones intersect at a display layer positioned between the array of pinlights and the pupil are determined. In the context of the present description, the display layer is any layer that is substantially transparent. In one embodiment the display layer is a transmissive spatial light modulator (SLM). A conventional example of an SLM is an overhead projector transparency or an LCD (liquid crystal display). The display layer may be entirely transparent or may encode an image. In one embodiment, the display layer is positioned less than a three centimeters in front of the array of pinlights (i.e., between the array of pinlights ant the pupil). In one embodiment, the array of pinlights is nearly imperceptible to the viewer when positioned between the near focus plane and the pupil and mounted on a substantially transparent substrate. In one embodiment, a pinlight see-through near-eye display constructed using a combination of the display layer and the array of pinlights may be suitably thin to be worn as eyeglasses while also being substantially transparent (i.e., see-through).

At step 115, the two or more light cones are modulated based on the overlap regions to produce a target image at or beyond the near focus plane. In the context of the following description, a target image appears to the viewer to be positioned at a virtual display plane that is at or beyond the near focus plane. In one embodiment, the virtual display plane is in front of the far plane. When the display layer is transparent and the array of pinlights is on, the target image is illuminated and visible. When the display layer encodes an image and the array of pinlights is on, the image appears as the target image. When the display layer is transparent and the array of pinlights is off, the target image is not visible and a viewer sees only the background environment.

In one embodiment, the two or more light cones are modulated by the display layer to form two or more pyramids, so that the two or more modulated light cones form a modified shape, such as a square at the pupil instead of a circle. For example, the display layer may be configured to implement an aperture that modulates a light cone so that portions of the light cone that are outside of the aperture are blocked at the display layer and light rays in the blocked portions do not reach the pupil. In one embodiment, liquid crystals in the display layer may be configured to form the aperture. When the modulated light cones form squares, the squares can be tiled to produce a uniformly illuminated target image because any overlap regions are reduced or eliminated. In contrast, when unmodulated light cones form circles, the circles cannot be easily tiled to produce a uniformly illuminated target image. In one embodiment, tracking information that indicates one or more of the diameter, orientation, and position of each pupil, and the tracking information is used to form apertures in the display layer that modulate the light cones to reduce or eliminate the overlap regions, as described in conjunction with FIGS. 4A, 4B, 5A, 5B, and 5C. In one embodiment, the tracking information includes the focal state that indicates where the pupil is focused (i.e., a distance from the pupil to a focal plane). When tracking information is not available, modulation of the light cones to form tiled squares is unreliable due to the uncertainty of an eyebox representation of the pupil compared with the tracked position, orientation, and/or diameter of the pupil. Modulation of the light cones to reduce the overlap regions based on the eyebox is described in conjunction with FIGS. 6A and 6B.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
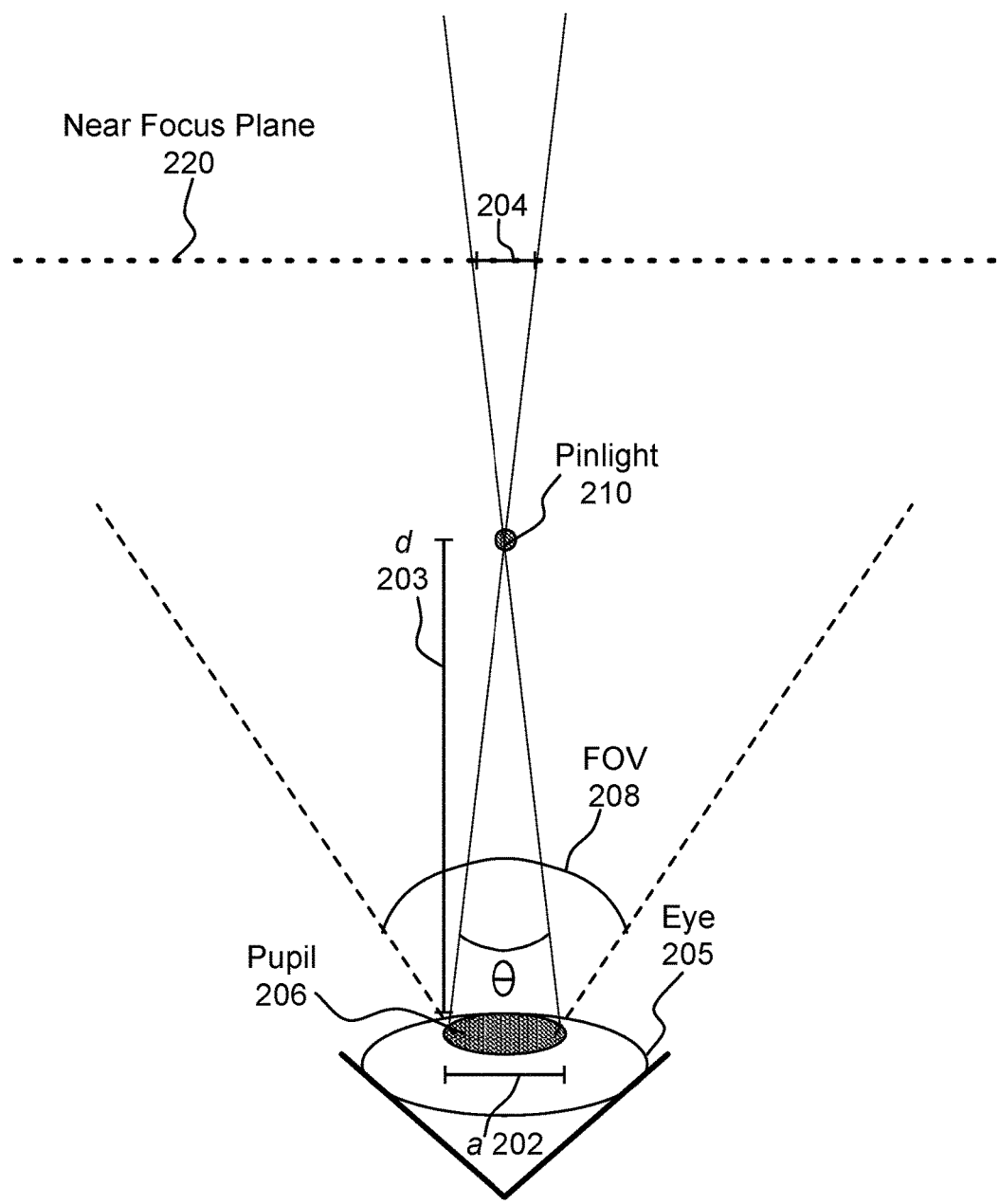
FIG. 2A illustrates an eye of an observer and a pinlight, according to one embodiment.

FIG. 2A illustrates an eye 205 of an observer (i.e., a viewer) and a pinlight 210, according to one embodiment. Objects between the eye 205 and a near focus plane 220 are too close to the eye 205 to be clearly seen because the eye cannot focus on objects that are closer to the eye 205 than the near focus plane 220. For example, the eye 205 sees the pinlight 210 as an unfocused circular blob having a diameter 204 positioned at the near focus plane 220. The eye 205 is able to focus on objects that are at or beyond (i.e., further away) the near focus plane 220. Objects that are very far away may also not appear clearly and a range referred to as an accommodation range within which objects may appear clearly is bounded by the near focus plane 220 and a far plane (not shown) that is a distance from the near focus plane 220 equal to the accommodation range. Because conventional eyeglasses are positioned closer to the eye 205 than the near focus plane 220, an image that is displayed on the surface of convention eyeglasses will not be clear to the viewer.

Some challenges involved with implementing a pinlight see-through near-eye display for augmented reality applications are that the display is positioned in front of the near focus plane 220 and close to the eye 205, the display should be see-through (i.e., substantially transparent), synthetic images produced by the pinlight see-through near-eye display should appear bright, even when the viewing environment is bright, and a synthetic object should be capable of appearing opaque. Additionally, the pinlight see-through near-eye display should have a wide field-of-view (FOV) that substantially fills a FOV 208 of the eye 205.

A field-of-projection (FOP) for the pinlight 210, $\theta=2*\tan^{-1}(a/2d)$ where a is the diameter 202 of a pupil 206 and d is a distance 203 from the pupil 206 to the pinlight 210. Assuming d=20 mm and a=4 mm, $\theta=11.4°$, which is not wide enough to substantially fill the FOV 208 of the eye 205. The FOP may be increased by decreasing d (i.e., positioning the pinlight 210 closer to the eye 205), including additional pinlights 210, or by reducing the FOV 208 of the eye 205 (i.e., increasing the diameter of the pupil 206). As described in further detail in conjunction with FIGS. 2D, 3A, 3B, 3C, and 5B, multiple pinlights 210 may be configured to form an array of pinlights to increase the collective FOP to substantially fill the FOV 208.

Figure 2B:
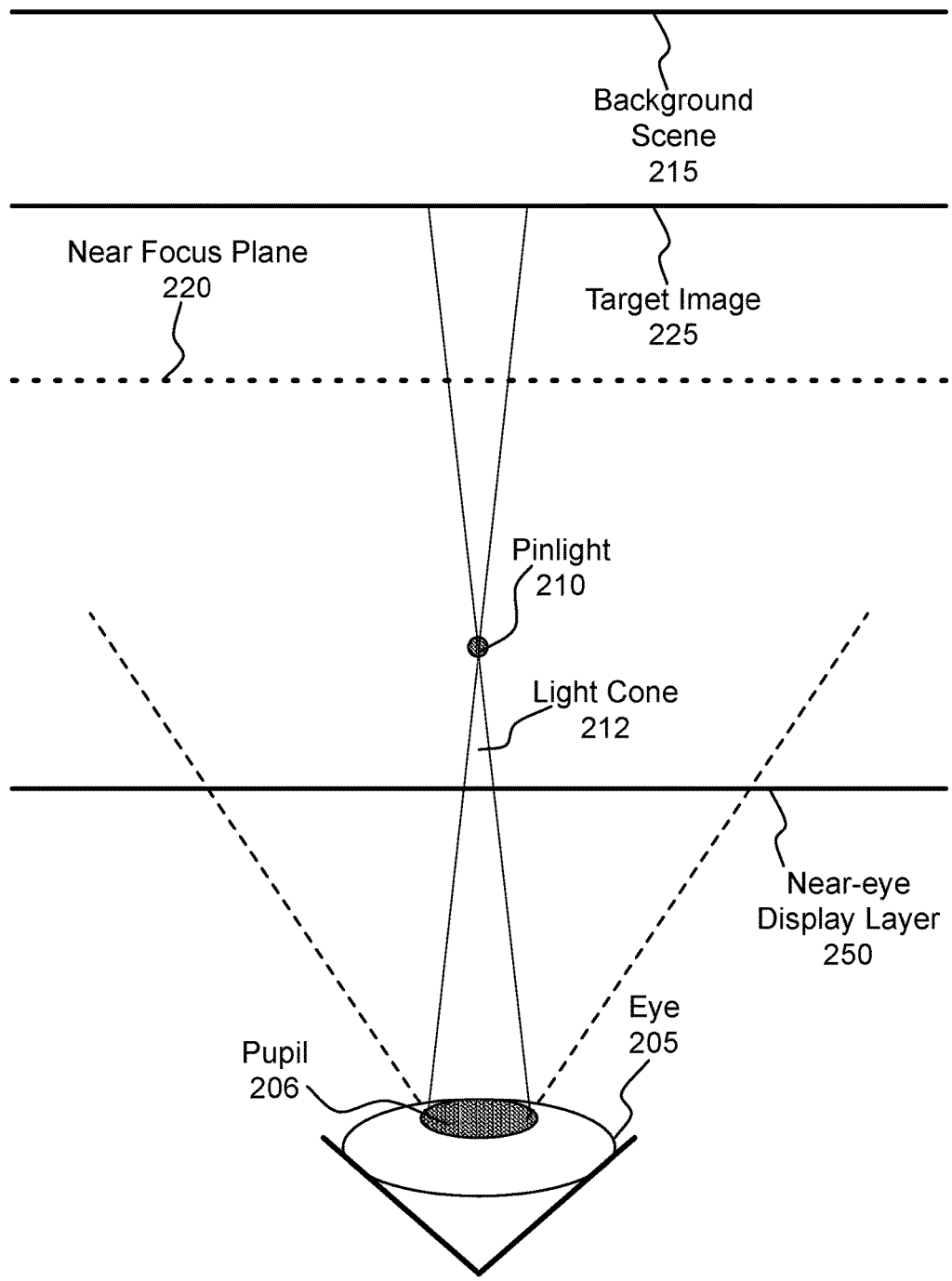
FIG. 2B illustrates the eye of an observer and the pinlight of FIG. 2A with the addition of a near-eye transparent display, according to one embodiment.

FIG. 2B illustrates the eye 205 of a viewer and the pinlight 210 of FIG. 2A with the addition of a near-eye display layer 250, according to one embodiment. As previously described, the near-eye display layer 250 is substantially transparent so that a viewer can see-through the near-eye display layer. The projection of the pinlight 210 onto the pupil 206 forms a light cone 212 having a circular base at the pupil 206. One or more rays of light emitted from the pinlight 210 that reach the pupil 206 are within the light cone 212 and can been seen by the viewer. The light cone 212 is the instantaneous field of view needed to ensure rays of light enter the pupil 206 and the light cone 212 corresponding to the pinlight 210 is used to determine how the light rays that intersect pixels of the near-eye display layer 250 should be modulated to produce the target image 225. The pinlight 210 projected through the near-eye display layer 250 acts as a miniature direct retinal projector with respect to the pupil 206, where a miniature direct retinal projector is a display device that renders a specific light modulation element (i.e., pixel) visible and in focus at one unique point (e.g., compact area) of the viewer's retina.

As previously explained, the near-eye display layer 250 may be configured to encode a synthetic image that appears as the target image 255 and the target image 225 may overlay a background scene 215 that is the environment. The target image 225 may be positioned at or behind the near focus plane 220. Examples of target images 225 include icons for navigation, labels of businesses, names of people, or other objects in the background scene 215.

Figure 2C:
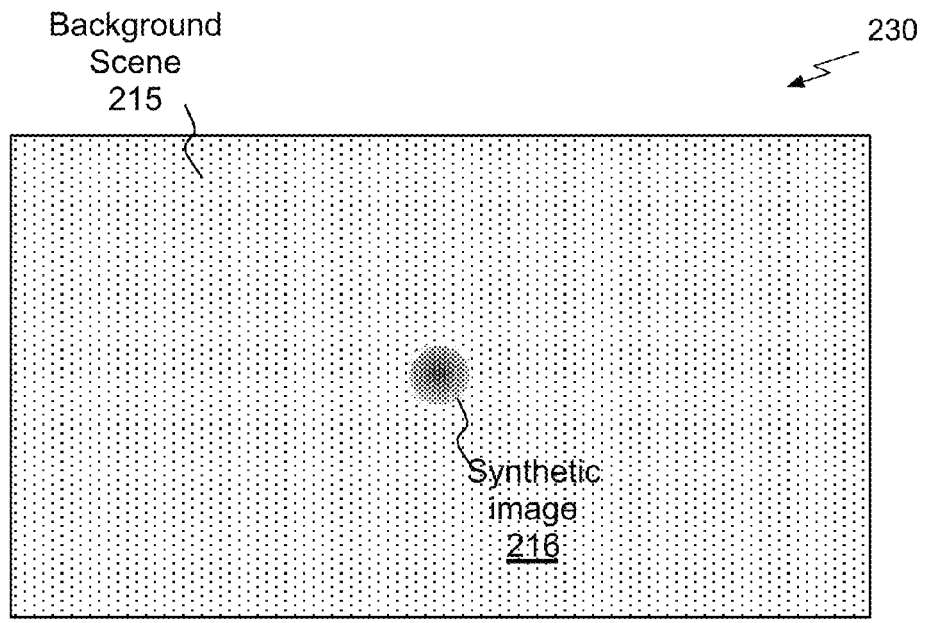
FIG. 2C illustrates the target image produced by the pinlight of FIG. 2A, according to one embodiment.

FIG. 2C illustrates a target image 230 produced by the pinlight 210 of FIG. 2B overlaid on the background scene 215, according to one embodiment. In one embodiment, the projection of the light cone 212 onto the near-eye display layer 250 may correspond to a single pixel of the near-eye display layer 250 and produce a pixel of the target image 230. In other embodiments, the projection of the light cone 212 onto the near-eye display layer 250 corresponds to a multiple pixels of the near-eye display layer 250 and produces multiple pixels of the target image 230 Like the pupil 206, the intersection of the light-cone 212 and the near-eye display layer 250 is circular and a circular synthetic image 216 appears in the target image 230 overlaid on the background scene 215. When the near-eye display layer 250 is configured to be transparent and does not modulate the light cone 212, the synthetic image 216 is a blurry circle, as shown in FIG. 2C. As previously suggested, the FOV 208 may be filled by including additional pinlights 210.

Figure 2D:
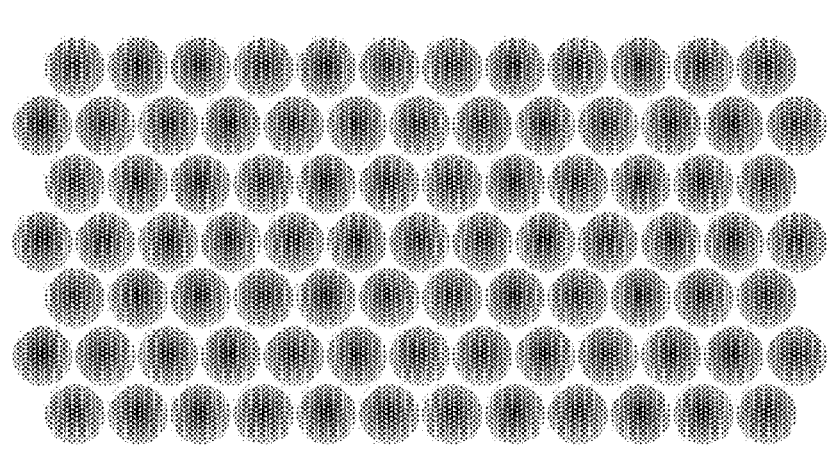
FIG. 2D illustrates a target image produced by an array of pinlights, according to one embodiment.

FIG. 2D illustrates a target image 235 produced by a two-dimensional array of pinlights 210, according to one embodiment. Each pinlight 210 in the array of pinlights 210 intersects the near-eye display layer 250 and corresponds to a circular shape within the target image 235. When the light cones corresponding to each pinlight 210 do not intersect each other at the near-eye display layer 250, the FOV 208 is sparsely filled by the circular shapes, as shown in FIG. 2D. The sparse coverage produces a target image 235 that is not continuous and therefore, is not capable of displaying synthetic images of substantially consistent brightness across the 208.

Figure 3A:
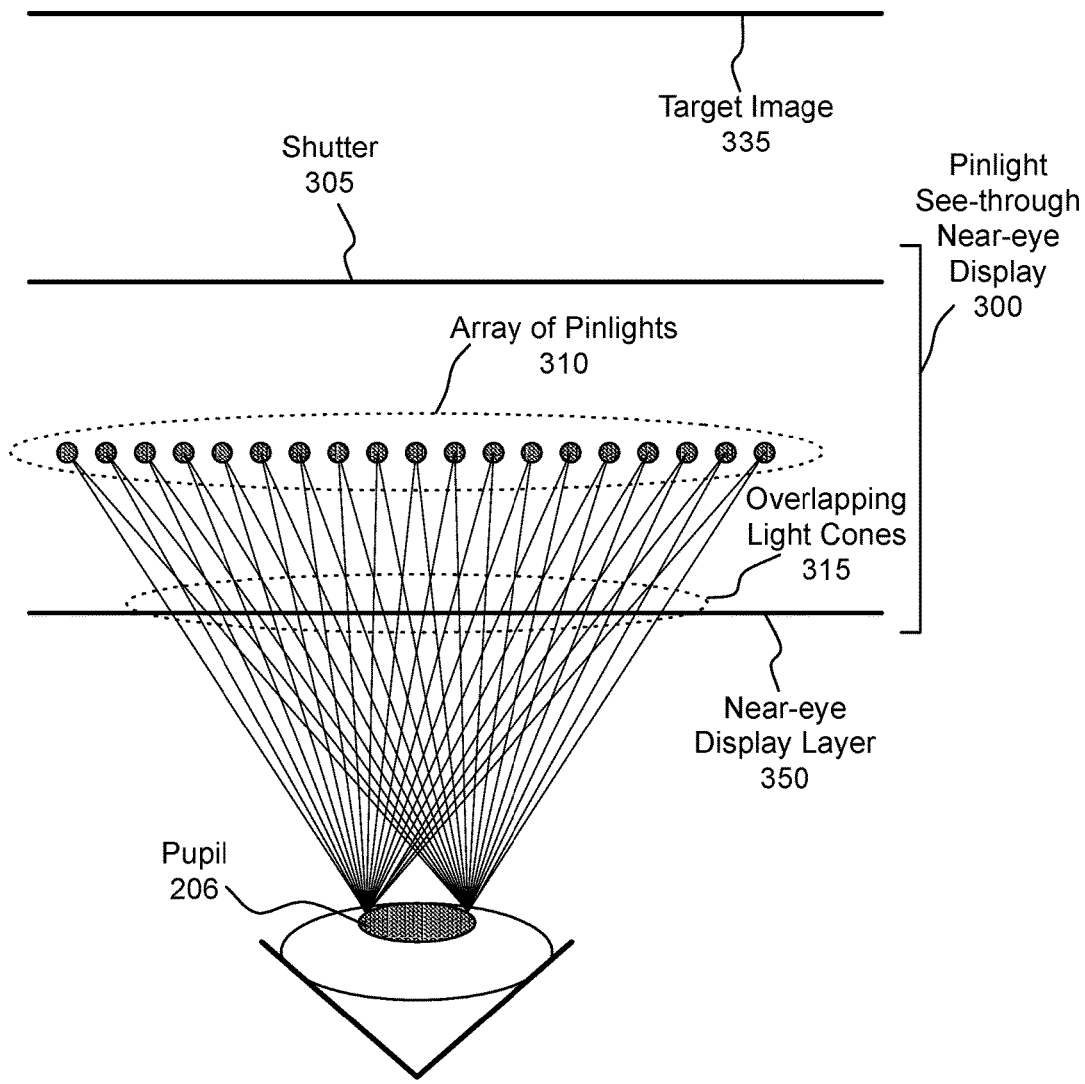
FIG. 3A illustrates the configuration of a transparent display and an array of pinlights with the addition of a shutter, according to one embodiment.

FIG. 3A illustrates the configuration of a pinlight see-through near-eye display 300, according to one embodiment. The pinlight see-through near-eye display 300 includes a near-eye display layer 350, an array of pinlights 310, and a shutter 305. A spacing between the individual pinlights in the array of pinlights 310 and the separation between the array of pinlights 310 and the near-eye display layer 350 may be set so that each pixel of the near-eye display layer 350 is illuminated by at most one pinlight, thereby mapping each pixel of the near-eye display layer 350 to an individual pinlight and corresponding light cone. When the light cones corresponding to the pinlights overlap, to form overlapping light cones 315, the light rays emitted through the near-eye display layer 350 produce a contiguous target image 325 at some desired focal distance from the near-eye display layer 350. Because the light cones are overlapping, the gaps between the circular shapes shown in the display image 235 of FIG. 2D are reduced. Each pinlight 210 projected through the near-eye display layer 350 acts as a miniature direct retinal projector with respect to the pupil 206. The combination of the many miniature projectors provided by the array of pinlights 310, each with adjacent narrow fields of projection, forms a single perceived wide field of projections that substantially fills the FOV 208 at the near-eye display layer 350.

When forming the target image 325, a time-multiplexed shutter 305 or wavelength selective filter may be used to prevent light from the environment from passing through the near-eye display layer 350, thereby preserving a sharp image at the target image 325. When configured to operate in a time multiplexed fashion to produce the target image 325, during a first phase of the time-multiplexing, the shutter 305 is closed to block light from the environment while the target image 325 is produced using the array of pinlights 310 and the near-eye display layer 350. To provide a see-through capability, during a second phase of the time-multiplexing, the array of pinlights 310 is turned off and the near-eye display layer 350 is set to a transparent state or wavelength selective filtering is used to prevent light from the array of pinlights 310 from passing through the near-eye display layer 350. In one embodiment, a portion of the pinlights in the array of pinlights 310 may be turned on during the second phase, and the near-eye display layer 350 may be configured to block light from the environment corresponding to an object in the target image 325 so that the target image will appear to be substantially opaque to the viewer.

In one embodiment, the intensity of the array of pinlights 310 and a duty cycle of the time-multiplexing shutter 305, in conjunction with a light sensor (not shown), may be controlled to allow adjustment of the total light intensity reaching the pupil 206. The intensity and/or duty cycle may be adjusted together to allow normalization of the total light reaching the pupil 206. Normalized light control allows the pupil 206 to receive the same amount of light from the real environment and target image 325 when environmental conditions change, such as when the viewer moves from indoors to outdoors. The intensity and/or duty cycle may also be controlled to change the perceived amount of light from the real environment and the target image 325. For example, the real environment could be dimmed to allow a more immersive experience or minimize distractions. Normalized light control may also be used to attempt to keep the size of the pupil 206 constant under changing lighting conditions. When the size of the pupil 206 is constant, the spacing between the pinlights in the array of pinlights 310 and/or the distance between the array of pinlights 310 and the near-eye display layer 350 does not necessarily need to vary to produce a consistent illumination at the target image.

The near-eye display layer 350 and array of pinlights 310 may be combined in an eyeglass form factor that can be comfortably worn to provide an augmented display experience. A substantially transparent or see-through pinlight near-eye display 300 may be achieved by combining a transparent SLM along with very small pinlights (e.g., approximately 250 μm×250 μm) that are nearly imperceptible when placed between the pupil 206 and near focus plane 220. The array of pinlights 310 may be mounted on or created over a transparent substrate, such as Indium Tin Oxide (ITO) glass. The combination of the near-eye display layer 350 and array of pinlights 310 may be constructed as a thin design: <=1 mm thickness for the near-eye display layer 350 implemented as a SLM, <=1 mm thickness for the array of pinlights 310, and a spacing of ~2.5 mm-20 mm between the near-eye display layer 350 and array of pinlights 310, for a total thickness of ~5-10 mm. In one embodiment, the see-through pinlight near-eye display 300 also includes the shutter 305.

Light rays may be expected to diffract considerably when passed through the near-eye display layer 350, limiting the resolution of the near-eye display layer 350 and target image 325 produced by the near-eye display layer 350. To increase the resolution, the image at the near-eye display layer 350 may be pre-distorted so that a target image 325 is produced that is closer to the intended image after diffracting through the near-eye display layer 350. In one embodiment, the pre-distorted image may be generated by implementing a forward model of the diffraction through the near-eye display layer 350 and solving an optimization problem to produce an image that most closely produces the intended image for the target image 325. In another embodiment, a computer generated hologram diffraction pattern maybe created to display on the near-eye display layer 350 that reproduces the intended light field (i.e., a set of directional "points" at the intended focal distance of the target image 325) when illuminated by the array of pinlights 310.

The array of pinlights 310 may be implemented by attaching surface mount or bare LED or laser chips to a transparent conductive substrate, e.g. ITO glass. The laser chips may be attached using a solder that is designed to adhere to glass or a conductive adhesive, or may be sandwiched between two transparent conductive substrates. In one embodiment, the array of pinlights 310 is implemented as a transparent programmable or fixed emissive display, such as a quantum dot (QD) or organic light-emitting diode (OLED) display. In another embodiment, the array of pinlights 310 is implemented as a transparent edge-lit waveguide that is patterned with a series of point scattering sites to create small bright spots. Other embodiments include using the end of a group of fiber optic cables to create an array of bright point light sources as the array of pinlights 310, or creating a hologram that reconstructs an array of virtual light sources at the intended distance when illuminated with a reference wave.

Rather than implementing the pinlight see-through near-eye display 300 in an eyeglass form factor, the pinlight see-through near-eye display 300 may be implemented as a contact lens. A single pinlight 210 (or an array of pinlights 310) and a transmissive SLM may be embedded into a soft or rigid contact lens, with some of the contact lens material serving as a thin spacer between the transmissive SLM and the single pinlight 210 (or an array of pinlights 310). Because the contact lens is very near the eye, the FOV 208 may be filled or nearly filled by the FOP of the single pinlight 210, so it may not be necessary to determine a tiling of multiple pinlights to reduce gaps (as shown in FIG. 2D) or overlap regions in the target image. Also, only a narrow spacing between the pinlight 210 (or an array of pinlights 310) and the transmissive SLM is needed because the contact lens is so close to the pupil.

Figure 3B:
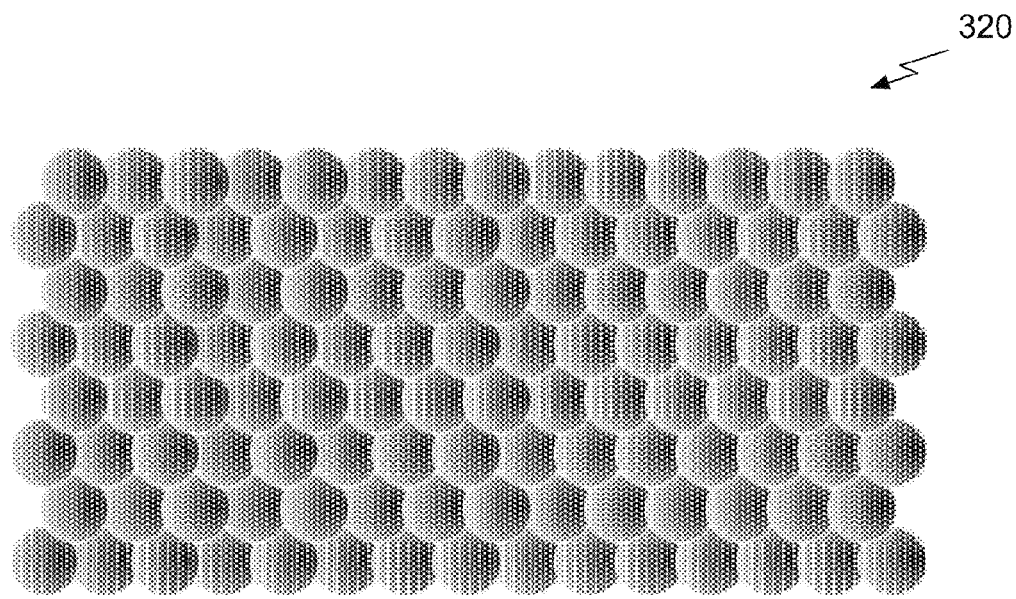
FIG. 3B illustrates a target image produced by the array of pinlights of FIG. 3A, according to one embodiment.

FIG. 3B illustrates a target image 320 produced by the array of pinlights 310 of FIG. 3A, according to one embodiment. The overlapping light cones 315 produce the target image 320, where each circular shape corresponding to an illuminated pinlight overlaps one or more adjacent circular shapes. One or more light cones may overlap by design and the circular shapes at the target image 320 corresponding to the array of pinlights 310 may also overlap when the pinlight see-through near-eye display 300 is configured as shown in FIG. 3A. One or more of the circular shapes or the light cones may overlap even when the shapes of the projections of the light cones at the near-eye display layer 350 are positioned to abut without overlapping (i.e., when the near-eye display layer 350 is positioned closer to the array of pinlights 310) because the diameter of the pupil 206 may change, the orientation of the pupil 206 may change, and/or the distance between the near-eye display layer 350 and the pupil 206 may change.

Figure 3C:
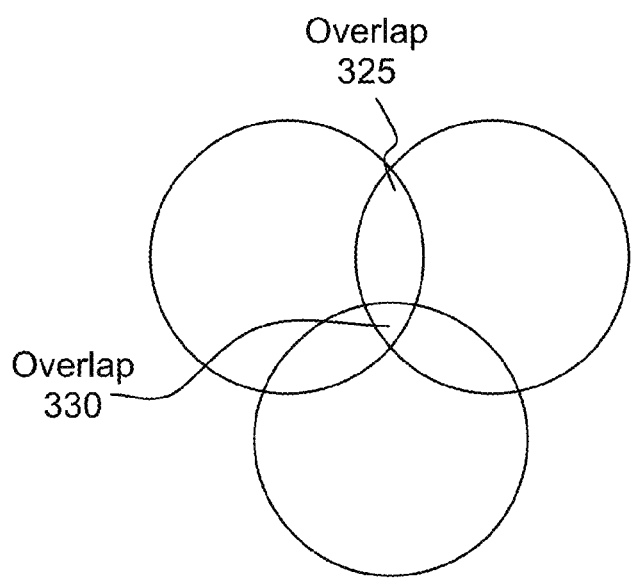
FIG. 3C illustrates overlap of shapes corresponding to the pinlights in the target image of FIG. 3B, according to one embodiment.

FIG. 3C illustrates overlaps 325 and 330 of shapes corresponding to the pinlights in the target image 320 of FIG. 3B, according to one embodiment. The target image 320 is contiguous (i.e., there are no gaps between the circular projections), but has uneven toning (i.e., inconsistent illumination) because the projections of the light cones at the near-eye display layer 350 overlap. At overlap 325, two circular projections illuminate the region of the target image 320 within the overlap 325. At overlap 330, three circular projections illuminate the region of the target image 320 within the overlap 330.

The uneven toning may be mitigated by increasing the amount by which the light cones overlap at the near-eye display layer 350 to decrease the differences in the illumination (i.e., a difference in illumination between the overlap 325 and overlap 330 is less than the difference in illumination between the overlap 325 and no overlap). However, increasing the size of the overlap regions decreases the spatial resolution of the pinlight see-through near-eye display 300. The uneven toning may also be mitigated by configuring the near-eye display layer 350 to randomize or shift the light cones to even toning of the target image 325 over time. Similarly, the array of pinlights 310 may be configured to turn on a subset of the pinlights in the array of pinlights 310 in a time-multiplexed manner to produce different masks representing attenuation patterns (e.g., randomized or shifted) to even toning over time for a single target image 325 or over time for a sequence of target images 325. The array of pinlights 310 may be configured as a denser array to implement the different attenuation patterns and provide increased resolution. The different attenuation patterns may each include all, some, or no overlapping light cones that correspond to different pixel sets of the near-eye display layer 350 and the different sets may be illuminated in a sequence to produce the target image 325 with even toning. Any overlap regions will appear as the time average of the pixel values given by the sequence of attenuation patterns. As a result, the variation in brightness caused by the different overlap regions may be reduced significantly or eliminated.

In one embodiment, the near-eye display layer 350 is configured to modulate the amount of light that illuminates the overlap regions when the different patterns are superimposed to best match an intended high resolution image at the target image 325. Time-multiplexing by turning on and off portions of a dense array of the pinlights 310 may adapt to changes in the diameter of the pupil 206. For example, when the diameter of the pupil 206 doubles, every other pinlight in the array of pinlights 310 can be turned off to reduce the frequency of time multiplexing.

Providing a target image 325 with even tone (i.e., consistent illumination) is difficult because the light cones defined by a pinlight and the pupil 206 are circular (due to the round aperture of the eye) and the circular geometry cannot be easily tiled without overlaps or gaps. In one embodiment, the tiling of the circular geometry is improved by implementing the array of pinlights 310 by positioning subsets of the pinlights at different distances from the near-eye display layer 350. A first subset of the pinlights produces larger circular projections at the near-eye display layer 350 and a second subset of the pinlights produces smaller circular projections at the near-eye display layer 350, where the smaller circular projections are interleaved to fill gaps between the larger circular projections (corresponding to the gaps shown in FIG. 2D). However, a better solution is to effectively modify the shape of the pupil to produce modified shapes at the near-eye display layer 350 that tiles without gaps or overlap. Examples of tiling geometry include squares, rectangles, rhomboids, trapezoids, triangles, and the like.

Figure 4A:
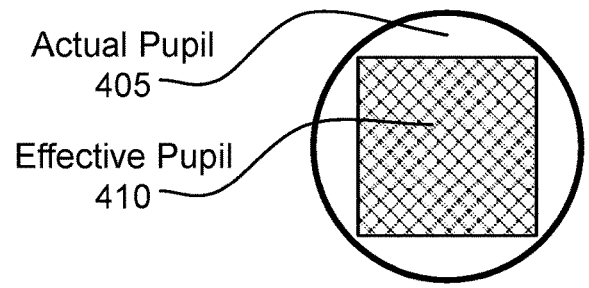
FIG. 4A illustrates a pupil and an effective pupil having a modified shape, in accordance with another embodiment.
Figure 4B:
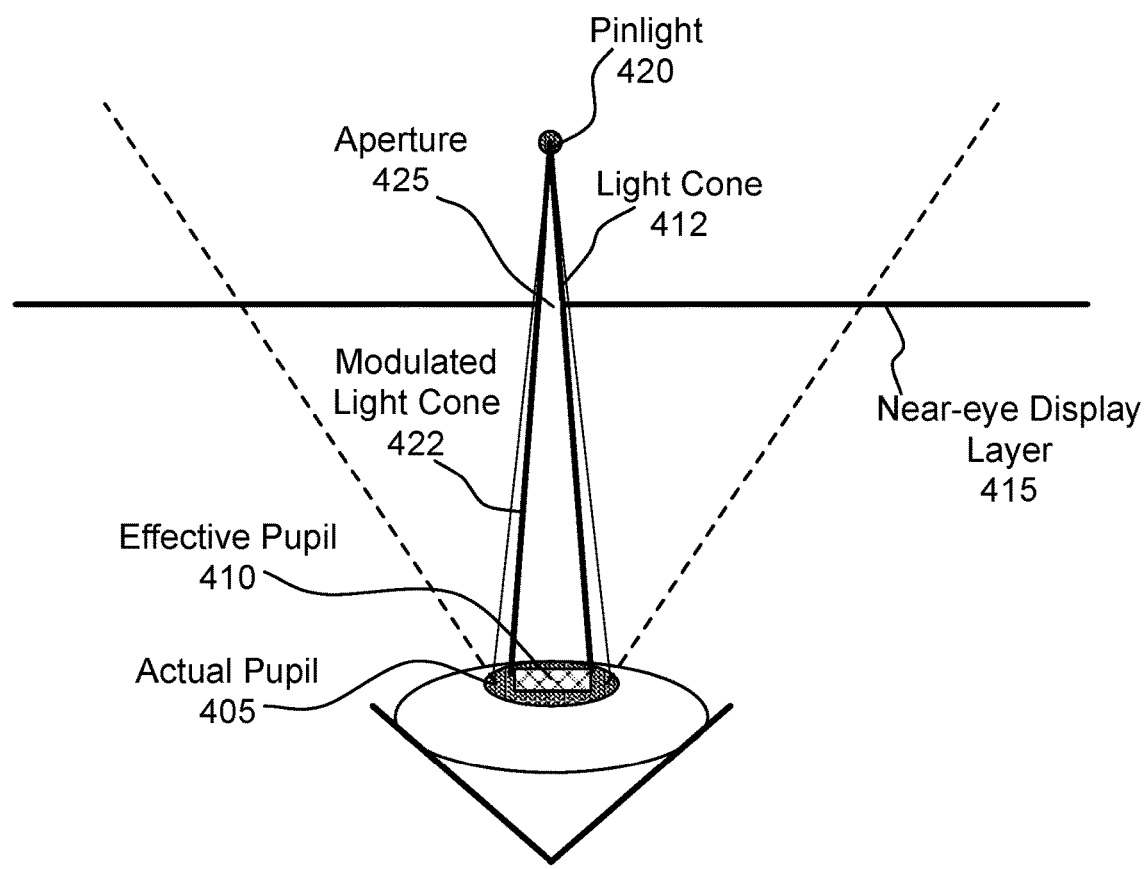
FIG. 4B illustrates a near-eye transparent display with spatial light modulation that is configured to produce the modified shape of the effective pupil, in accordance with one embodiment.

FIG. 4A illustrates an actual pupil 405 having a circular shape and an effective pupil 410 having a modified shape that is square, in accordance with another embodiment. FIG. 4B illustrates a near-eye transparent display layer 415 with spatial light modulation capabilities that is configured to produce the modified shape of the effective pupil 410, in accordance with one embodiment. A light cone 412 corresponding to a pinlight 420 may be modulated by the near-eye display layer 415 to form a pyramid as the light cone passes through the near-eye display layer 415, so that the modulated light cone 422 projects a square at the actual pupil 405 instead of a circle. An aperture 425 is encoded in the near-eye display layer 415 to block a portion of the light rays emitted by the pinlight 420 so that the blocked light rays do not reach the actual pupil 405. The near-eye display layer 415 may also include an image. The aperture 425 is positioned to allow only light rays within the effective pupil 410 to pass through the near-eye display layer 415. The one or more apertures that are encoded in the near-eye display layer 415 may be represented as a mask that is static or computed dynamically. The mask may by defined by a single bit (e.g., opaque or transparent) for one or more samples of each pixel of the near-eye display layer 415 or the mask may be defined by multiple bits (e.g., 256 levels of transparency) for one or more samples of each pixel of the near eye display layer 415. The mask encodes an attenuation pattern that modulates the light rays that are emitted from the pinlight to produce a desired target image.

Figure 5A:
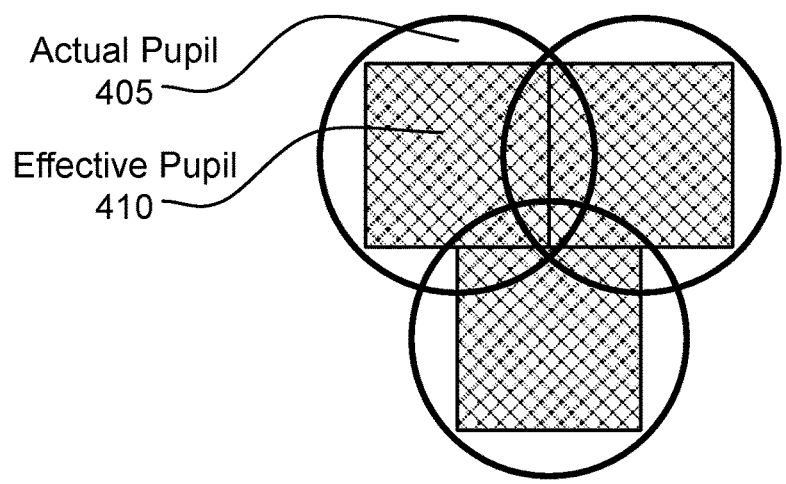
FIG. 5A illustrates a pupil and an effective pupil having a modified shape, in accordance with another embodiment.

FIG. 5A illustrates the actual pupil 405 and the effective pupil 410 having a modified shape, in accordance with another embodiment. When modulated light cones form squares, the squares can be tiled to produce a uniformly illuminated target image because any overlap regions are minimized or reduced, as shown in FIG. 5A. The mask may be encoded to produce an effective pupil 410 that has "soft" edges and the square may be tiled with some overlap so that the soft edges of adjacent square overlap. The "soft" edges may be encoded by varying a transparency or opacity of the mask. The mask may also be configured based on radiometric information corresponding to the pinlight see-through near-eye display. For example, transparency of the mask across the square shape may vary based on a radiometric intensity of the array of pinlights. The radiometric information may be generated by photographing the pinlight see-through near-eye display while a fully illuminated target image is displayed and measuring inconsistencies in the illumination resulting from to directional variations in light produced by the pinlights to calibrate the pinlight see-through near-eye display.

Figure 5B:
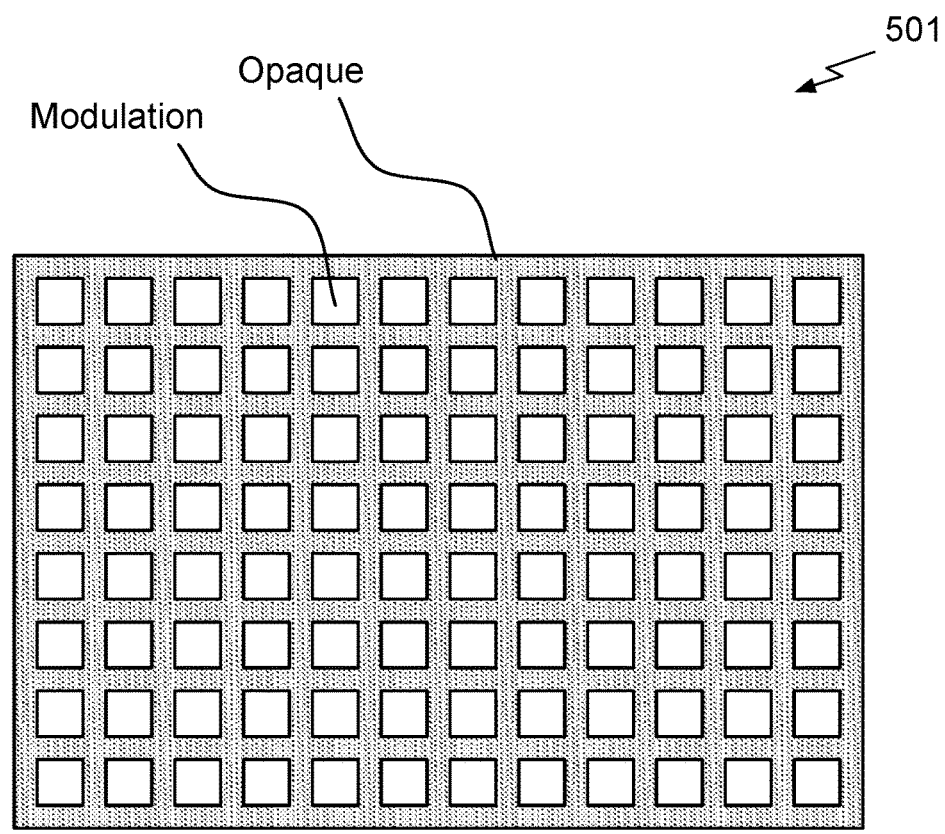
FIG. 5B illustrates an attenuation pattern 501 generated by the near-eye display layer 415, in accordance with one embodiment.

FIG. 5B illustrates an attenuation pattern 501 generated by the near-eye display layer 415, in accordance with one embodiment. In this case, the near-eye display layer 415 encodes a grid of opaque lines, such that each pinlight is only visible though a set of disjoint square. Pixels within each square are then modulated (varying in opacity) so that light rays passing through a square and entering the pupil have the desired intensity (and color). As a result, the squares will appear magnified in a target image. If the pupils, pinlights, and near-eye display layer 415 are configured and operated appropriately, then the squares will be abutting precisely in the target image. Usually eye tracking is needed to configure the near-eye display layer 415 so that the squares are precisely aligned in the target image. In other embodiments, the attenuation pattern 501 forms shapes other than squares that also tile without overlap or gaps, such as rectangles, hexagons, triangles, trapezoids, and the like.

Figure 5C:
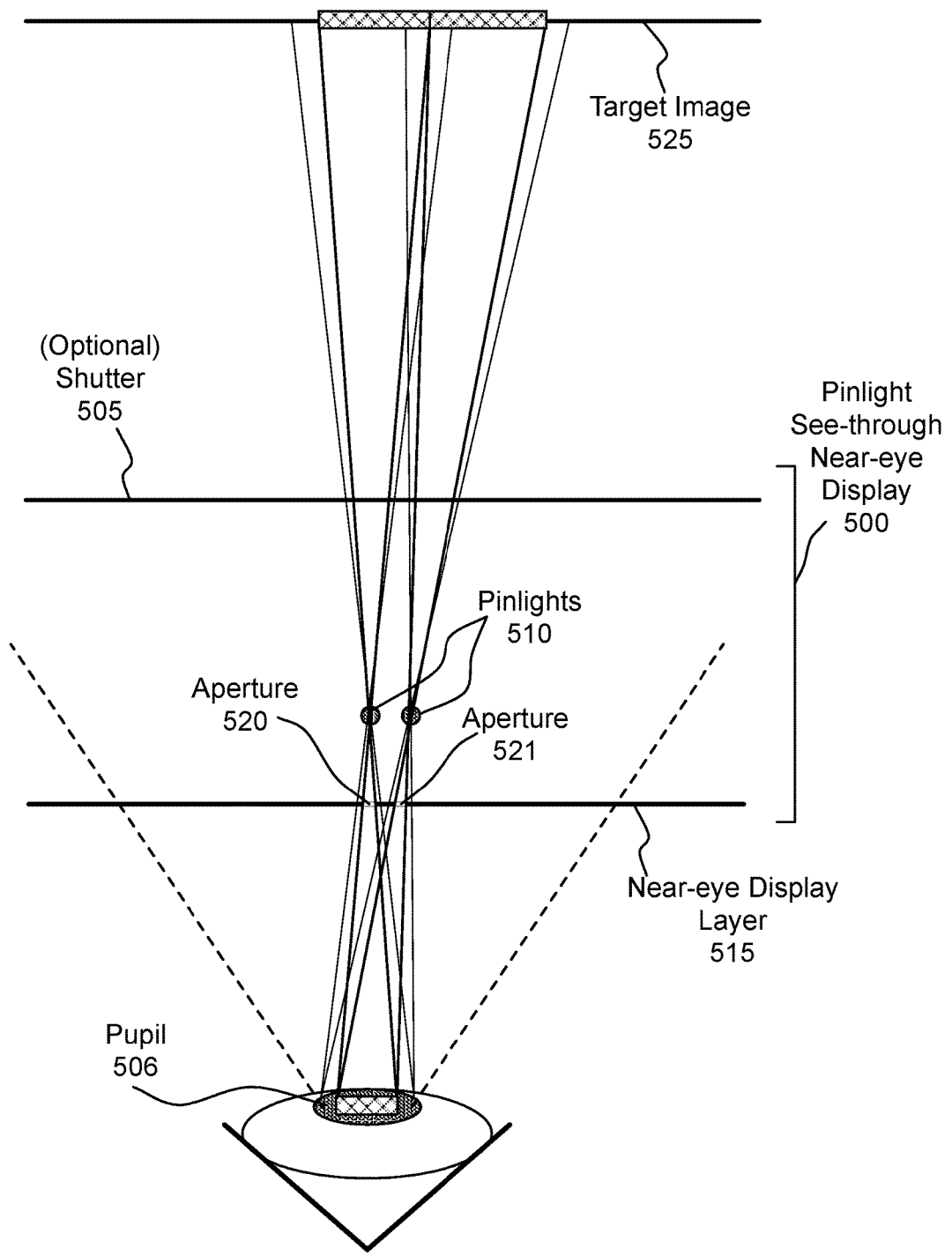
FIG. 5C illustrates a target image produced by a pinlight see-through near-eye display, in accordance with one embodiment.

FIG. 5C illustrates a target image 525 produced by a pinlight see-through near-eye display 500, in accordance with one embodiment. When tracking information is available, the pinlight see-through near-eye display may be configured so that shapes of the projections of the light cones at the near-eye display layer 515 (i.e., shapes corresponding to the effective shape of the pupil 506) form a grid of squares corresponding to the attenuation pattern 501 shown in FIG. 5B at the near-eye display layer 515 and abut at the target image 525 or the near focus plane. In contrast, when tracking information is not available, there may be a significant loss in spatial resolution at the near-eye display layer 515 and/or the target image 525. The configuration of the near-eye display layer 515 when tracking information is not available is described in conjunction with FIGS. 6A and 6B.

The near-eye display layer 515 may be configured with a mask that represents the apertures 520 and 521, such as a mask encoding the attenuation pattern 501. The apertures 520 and 521 modulate the light cones corresponding to the pinlights 510 to modify an effective shape of the pupil 506. A target image 525 is produced by the pinlights 510 with each of the modulated light cones producing a respective portion of the target image 525. The near-eye display layer 515 may be positioned closer to the pinlights 510 to produce a target image 525 that is evenly toned or additional pinlights may be included that are time-multiplexed with the pinlights 510 and have apertures encoded in the near-eye display layer 515 as needed to produce an evenly toned target image 525. In one embodiment, each of the pinlights 510 is sized to substantially equal the size of pixels of the near-eye display layer 515.

An optional shutter 505 may be included in the pinlight see-through near-eye display 500 to block light from the environment, as previously described. The shutter 505 may not be needed when the pinlight see-through near-eye display 500 is operated in a dark environment.

In practice, the viewer wearing the pinlight see-through near-eye display may change a position of the pinlight see-through near-eye display, the diameter of the viewer's pupil 506 may change, or the direction in which the pupil 506 is pointed may change (i.e., orientation or gaze of the pupil 506). In one embodiment, tracking information that indicates a change in gaze, pupil diameter, focal state, and/or distance from the pupil to the pinlight see-through near-eye display is provided. The tracking information may be acquired using techniques known in the art, such as sensing the pupil diameter and/or gaze using a camera. The pinlight see-through near-eye display may be configured based on the tracking information to improve the quality (e.g., brightness, toning, resolution, etc.) of the target image 525. In one embodiment the array of pinlights is dynamic and positions of the pinlights may be controlled. In another embodiment, the array of pinlights may be fixed and different patterns may be controlled by time-multiplexing to switch between the different patterns. In either case, the objective of the control is to evenly tile an effective shape of the pupil 506 across the target image 525, where the effective shape of the pupil is determined by modulating the light cones at the near-eye display layer 515.

Figure 5D:
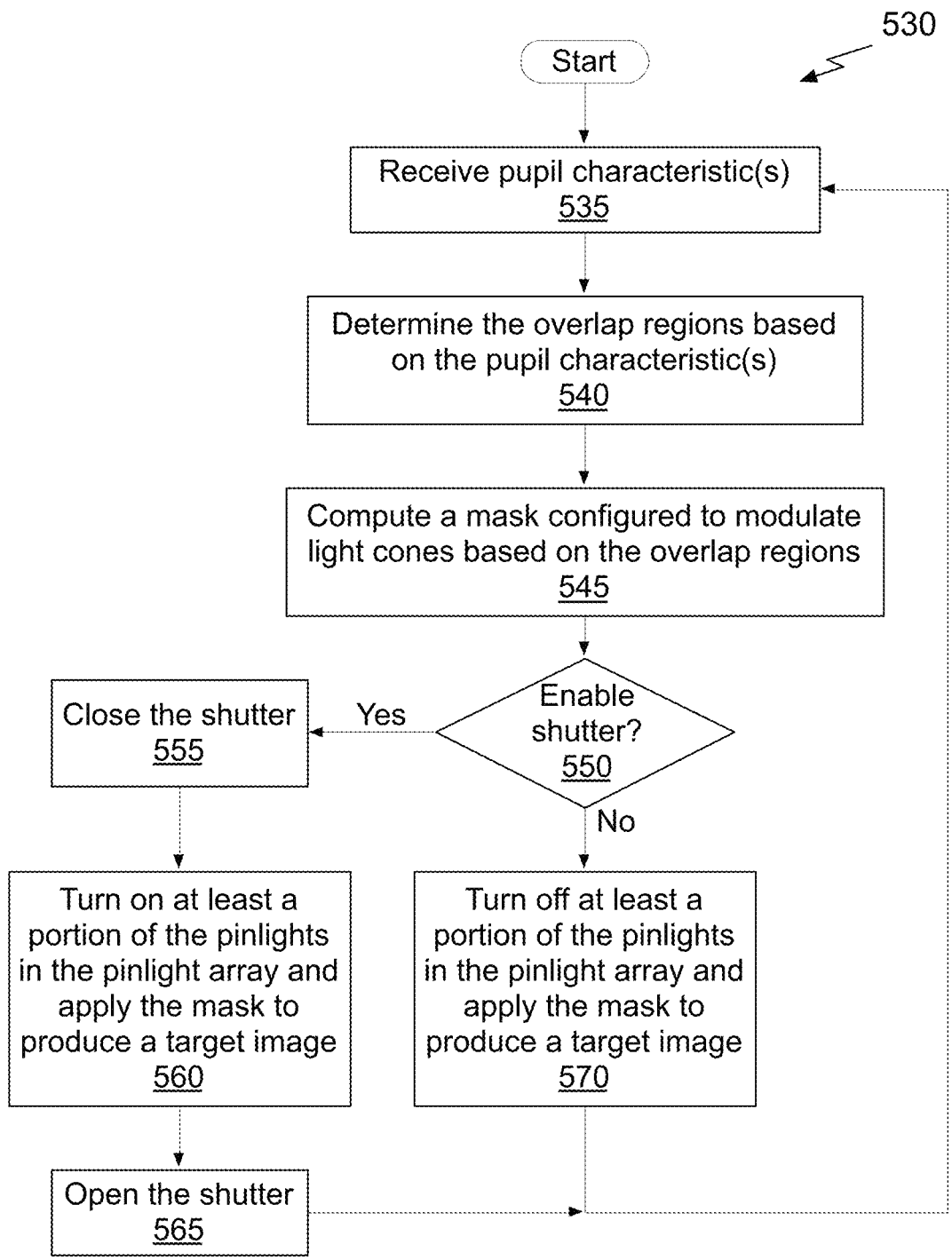
FIG. 5D illustrates a flowchart of a method for producing a target image using the near-eye transparent display of FIG. 5C, in accordance with one embodiment.

FIG. 5D illustrates a flowchart of a method 530 for producing a target image using the pinlight see-through near-eye display 500 of FIG. 5C, in accordance with one embodiment. Although the method 530 is described in the context of a program executed by a processor, the method 530 may also be performed by custom circuitry or by a combination of custom circuitry and a program.

At step 535, one or more pupil characteristics are received by a processor. The pupil characteristics may include one or more of a pupil diameter, a pupil gaze, focal state, and a distance from the pupil to the pinlight see-through near-eye display 500. At step 540, overlap regions where two or more light cones intersect at the near-eye display layer 515 positioned between the array of pinlights 510 and the pupil 506 are determined based on at least the pupil characteristic(s). Characteristics of the pinlight see-through near-eye display 500 may also be used to determine the overlap regions, such as spacing between pinlights and distances between the pinlights and the near-eye display layer 515.

At step 545, the processor computes a mask that is configured to modulate the light cones based on the overlap regions. In one embodiment, the mask is configured to reduce or eliminate the overlap regions so that projections of the light cones at the near-eye display layer 515 abut to produce an evenly toned display image. The mask is encoded into the near-eye display layer 515 to modulate the light cones.

At step 550, the processor determines if a shutter 505 is enabled for operation (i.e., to be closed or opened). If so, at step 555, the shutter 505 is closed. Then, at step 560, at least a portion of the pinlights in the array of pinlights 510 are turned on and the mask is applied by the near-eye display layer 515 to produce the target image 525. When the mask is applied, the light cones are modulated according to the mask. Step 560, may be performed with different portions of the pinlights turned on and with corresponding masks when time-multiplexing techniques are used. At step 565, the array of pinlights 510 is turned off, the near-eye display layer 515 is configured to be transparent and the shutter 505 is opened before the processor returns to step 535.

If, at step 550, the shutter 505 is not enabled, then at step 570, at least a portion of the pinlights in the array of pinlights 510 are turned off and the near-eye display layer 515 may be configured to be transparent. In one embodiment, all of the pinlights in the array of pinlights 510 are turned off. In one embodiment, all of the pinlights in the array of pinlights 510 are turned off and the mask is configured to locally dim regions of the real-world scene so that the target image 525 appears brighter to the viewer when the target image 525 is displayed by the near-eye display layer 515 during a different time-multiplexed phase.

The processor returns to step 535 to display the target image 525. The target image 525 may be changed by encoding a different image into the near-eye display layer 515 and/or change in the pupil characteristics may have occurred. Additionally, a change may have occurred in the viewing environment, such as head position, environmental lighting changes, or other sensor inputs (e.g., ambient lighting). The pinlight see-through near-eye display 500 provides a wide field-of-view and may be implemented in a compact eyeglass form factor to provide an augmented reality experience. The quality of the target image may be increased by adjusting the pinlight see-through near-eye display 500 based on pupil characteristics provided by tracking information.

Figure 6A:
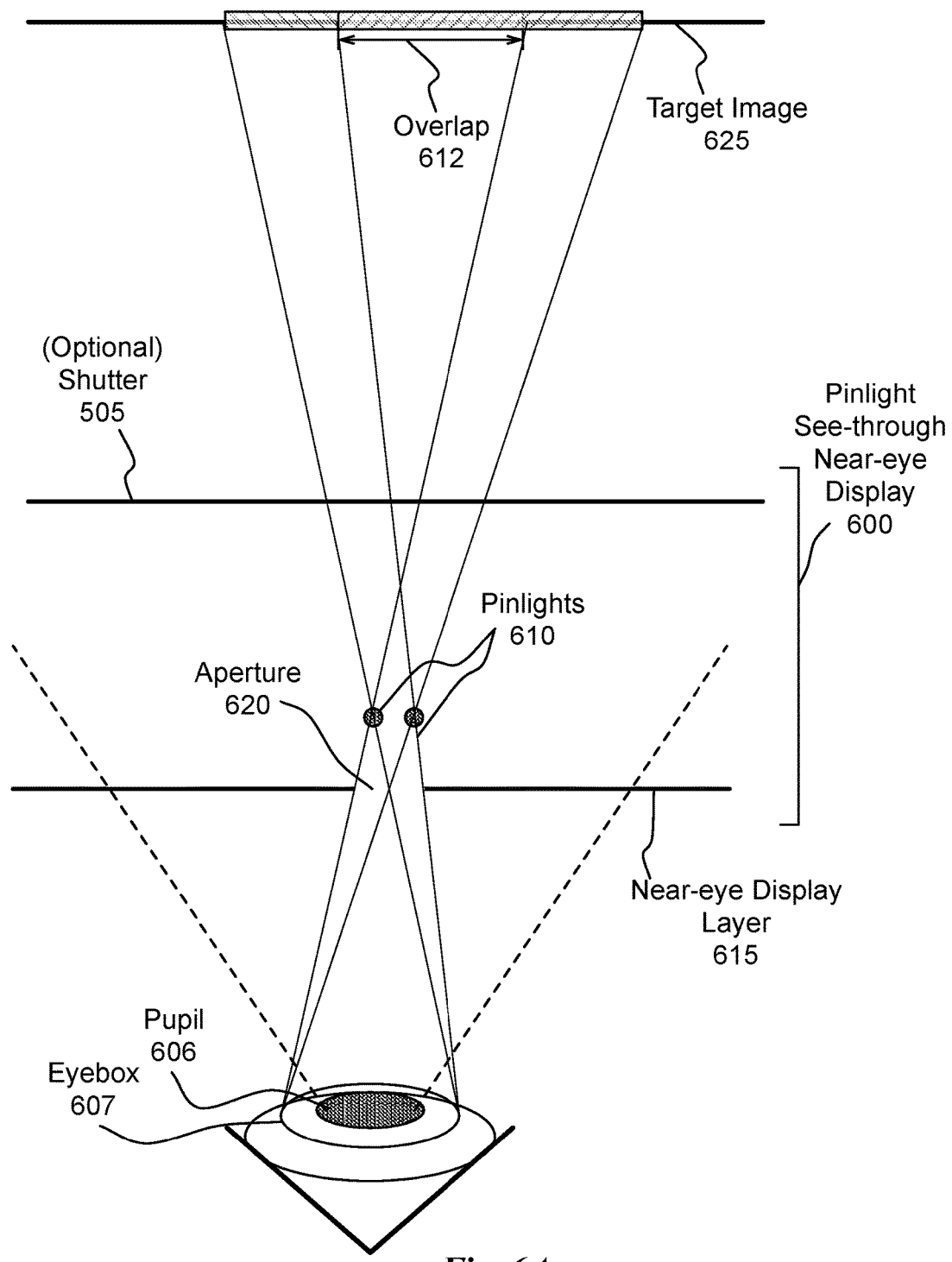
FIG. 6A illustrates a target image produced by a pinlight see-through near-eye display, in accordance with one embodiment.

FIG. 6A illustrates a target image 625 produced by a pinlight see-through near-eye display 600, in accordance with one embodiment. When tracking information is not available, it is assumed that a diameter and gaze of the pupil 606 are unknown, but within some bounds defined by the eyebox 607. The eyebox 607 is a field-of-view corresponding to the pupil 606. For example, a diameter of the pupil 606 may be represented as a range of possible values and the gaze of the pupil 606 may be represented as a range of possible directions. In one embodiment, the eyebox 607 may be 2-10 times the size of the pupil 606. The light cones connect each pinlight 610 to the boundary of the eye box 607 that forms the base of the light cone. The pinlight see-through near-eye display 600 may be configured so that shapes of the projections of the light cones at the near-eye display layer 615 abut at the near-eye display layer 615 and overlap at the target image 625 or the near focus plane. The amount of overlap 612 is shown at the target image 625.

The near-eye display layer 615 should be positioned so the intersections of the light cones precisely abut regions at the near-eye display layer 615. The near-eye display layer 615 may be configured to modify the shape projected by each light cone at the intersection with the near-eye display layer 615. As shown in FIG. 6A, the aperture 620 does not modify the shape, but the aperture 620 could be configured to form a shape that tiles without overlap or gaps, such as squares, rectangles, hexagons, triangles, trapezoids, and the like. Time-multiplexing may be employed to apply different attenuation patterns that correspond to different overlapping, abutting, and/or non-overlapping apertures for different time-multiplexed phases. Each pixel of the near-eye display layer 615 modulates a specific light ray that originates at a pinlight 610 and passes through the eye box 607 (i.e., each pixel is illuminated by a single pinlight 610, when viewed from anywhere in the eye box 607). The near-eye display layer 615 may be configured using opacity/transparency and color to modulate the light rays and synthesize a set of light rays approximating a target image 625.

Compared to the near-eye display layer 515 that is configured using tracking information, the magnified display layer regions produced by each modulated light cone will not appear abutting in the target image 625. Instead, the magnified display layer regions overlap. As a result, multiple pixels on the near-eye display layer 615 will depict the same point in the target image 625; this redundancy leads to a reduction in the perceived resolution of the target image 625 relative to the resolution of the target image 525 that is produced based on tracking information. It is possible to display a light field so that the pupil 606 may focus at multiple depths in the target image 625 and/or background image. However, the physical gap between the pinlights 610 and the eye display layer 615 may be reduced for the pinlight see-through near-eye display 600 compared with the pinlight see-through near-eye display 500 and there is no need for an eye tracking system.

An optional shutter 605 may be included in the pinlight see-through near-eye display 600 to block light from the environment, as previously described. The shutter 605 may not be needed when the pinlight see-through near-eye display 600 is operated in a dark environment.

The pinlight see-through near-eye display 600 may be configured based on environmental information to improve the quality (e.g., brightness, toning, resolution, etc.) of the target image 625. Additional pinlights may be included that are time-multiplexed with the pinlights 610 and have apertures encoded in the near-eye display layer 615 as needed to produce an evenly toned target image 525. In one embodiment, each of the pinlights 610 is sized to substantially equal the size of pixels of the near-eye display layer 615.

In one embodiment, the array of pinlights is dynamic and positions of the pinlights may be controlled. In another embodiment, the array of pinlights may be fixed and different attenuation patterns may be controlled by time-multiplexing to switch between the different attenuation patterns. In either case, the objective of the control is to produce an evenly image as the target image 625.

Figure 6B:
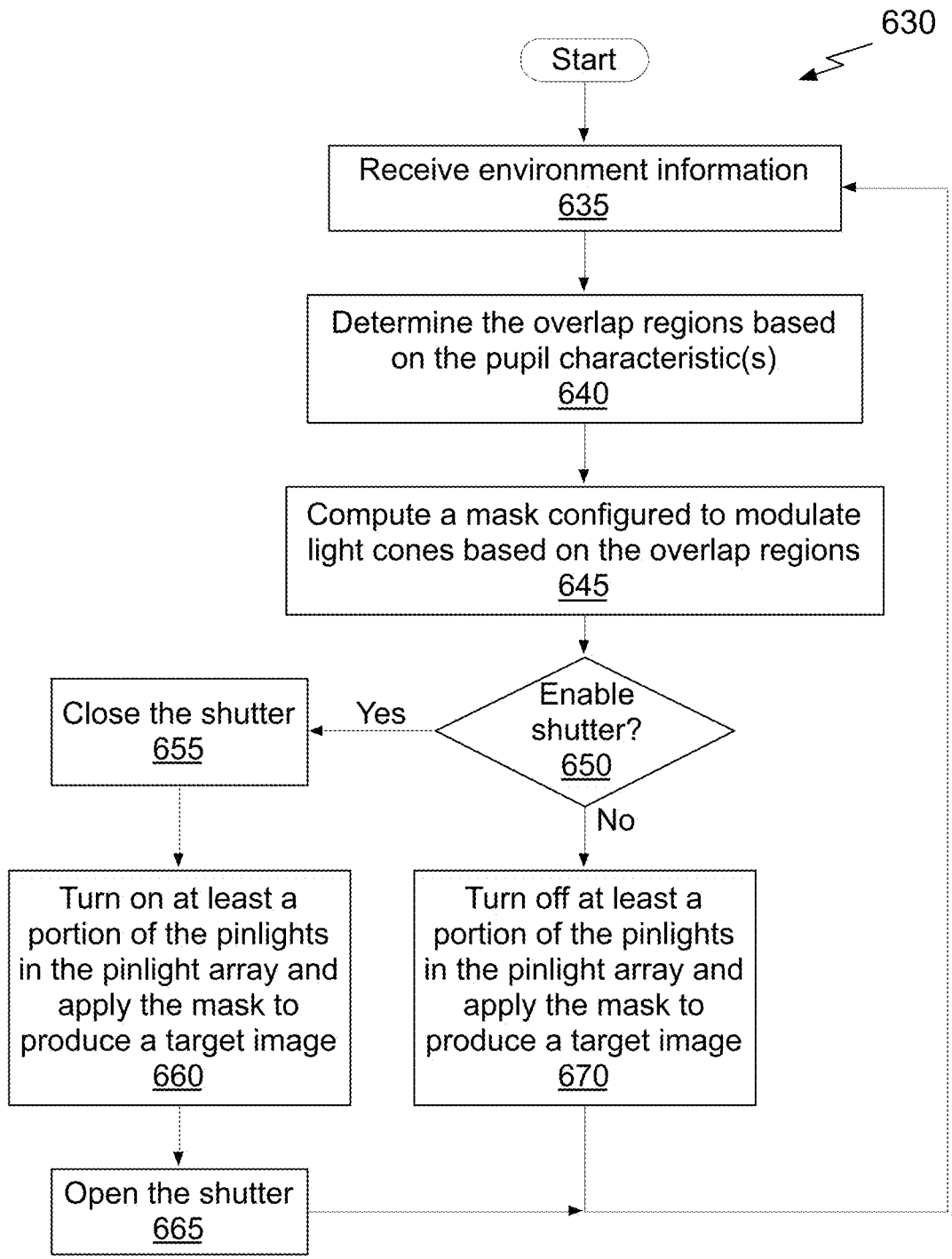
FIG. 6B illustrates a flowchart of a method for producing a target image using the near-eye transparent display of FIG. 6A, in accordance with one embodiment.

FIG. 6B illustrates a flowchart of a method 630 for producing a target image using the pinlight see-through near-eye display 600 of FIG. 6A, in accordance with one embodiment. Although the method 630 is described in the context of a program executed by a processor, the method 630 may also be performed by custom circuitry or by a combination of custom circuitry and a program.

At step 565, environmental information received by a processor, such as head position, environmental lighting changes, or other sensor inputs (e.g., ambient lighting). Steps 640, 645, 650, 655, 660, 665, and 670 correspond to previously described steps 540, 545, 550, 555, 560, 565, and 570. The target image 625 may be changed by encoding a different image into the near-eye display layer 615 and/or a change in the environmental information may have occurred. Additionally, a change may have occurred in the viewing environment. The pinlight see-through near-eye display 600 provides a wide field-of-view and may be implemented in a compact eyeglass form factor to provide an augmented reality experience. The quality of the target image 625 may be increased by adjusting the pinlight see-through near-eye display 600 based on environmental information.

Figure 7:
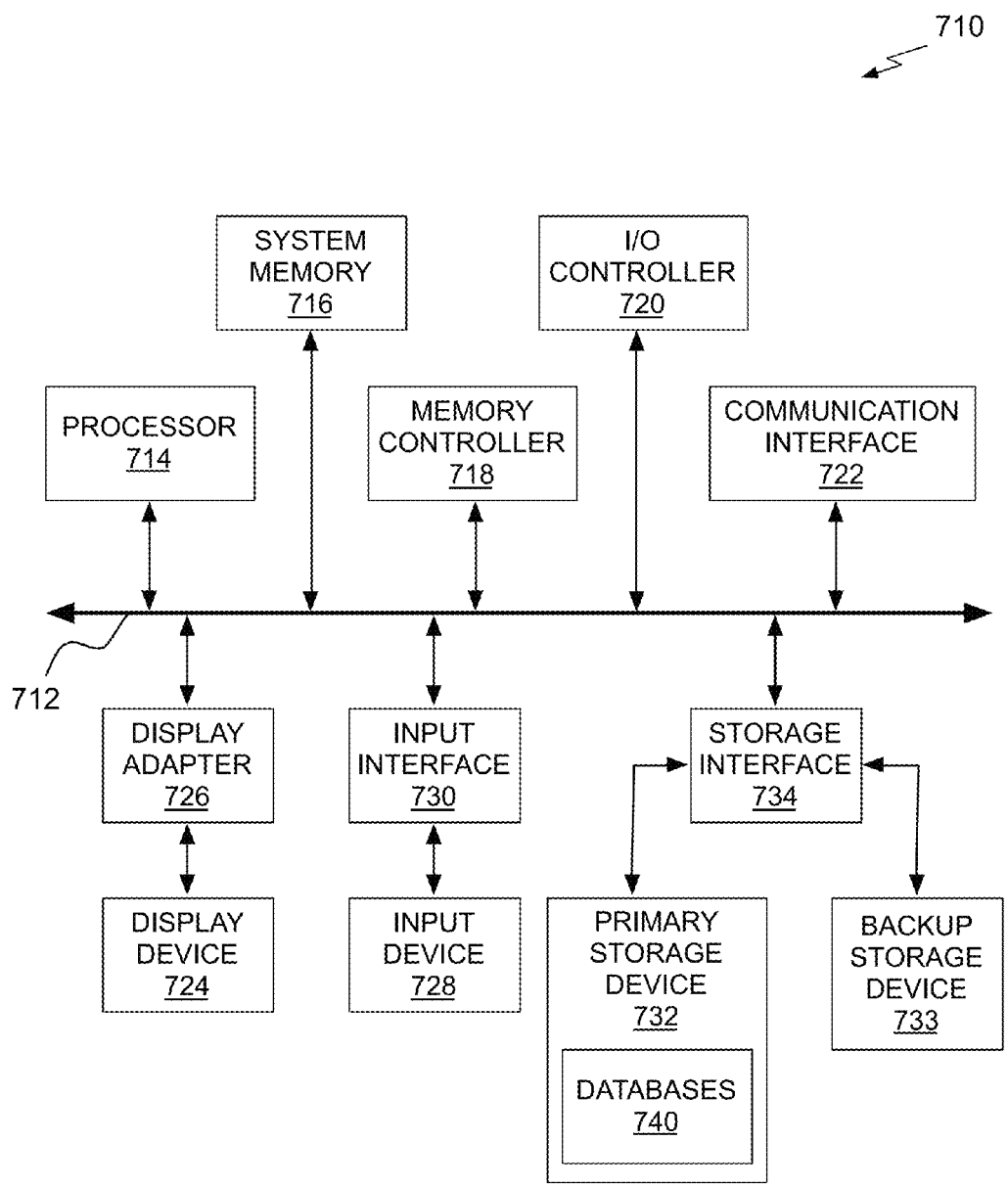
FIG. 7 illustrates an exemplary computer system in which the various architecture and/or functionality of the various previous embodiments may be implemented.

FIG. 7 is a block diagram of an example of a computing system 710 capable of implementing embodiments of the present disclosure. Computing system 710 broadly represents any single or multi-processor computing device or system capable of executing computer-readable instructions. Examples of computing system 710 include, without limitation, workstations, laptops, client-side terminals, servers, distributed computing systems, embedded devices, automotive computing devices, handheld devices (e.g., cellular phone, tablet computer, digital camera, etc.), worn devices (e.g. head-mounted or waist-worn devices), or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, RAM, ROM, flash memory, or any other suitable memory device. Although not required, in certain embodiments computing system 710 may include both a volatile memory unit (such as, for example, system memory 716) and a non-volatile storage device (such as, for example, primary storage device 732).

Computing system 710 may also include one or more components or elements in addition to processor 714 and system memory 716. For example, in the embodiment of FIG. 7, computing system 710 includes a memory controller 718, an input/output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between example computing system 710 and one or more additional devices. For example, communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In one embodiment, communication interface 722 provides a direct connection to a remote server via a direct link to a network, such as the Internet. Communication interface 722 may also indirectly provide such a connection through any other suitable connection.

Communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data for display on display device 724. In one embodiment, the display device 724 may be the pinlight see-through near-eye display 500 and one or more components shown in the computing system 710 may be integrated into an eyeglass form factor of the pinlight see-through near-eye display 500. In one embodiment, one or more of the components shown in the computing system 710 are external to the eyeglass form factor and may be worn elsewhere by a user or may be entirely remote (i.e., connected via a wireless or wired communication system). A power supply (i.e., battery, power source, or power interface) may be integrated into the eyeglass form factor or may be external to the eyeglass form factor.

As illustrated in FIG. 7, computing system 710 may also include at least one input device 728 coupled to communication infrastructure 712 via an input interface 730. Input device 728 generally represents any type or form of input device capable of providing input, either computer- or human-generated, to computing system 710. Examples of input device 728 include, without limitation, a keyboard, a pointing device, a speech recognition device, an eye-tracking system, ambient light sensing system, depth sensor, light field camera, environmental motion-tracking sensor, an internal motion-tracking sensor, a gyroscopic sensor, accelerometer sensor, an electronic compass sensor, a charge-coupled device (CCD) image sensor, a complementary metal-oxide-semiconductor (CMOS) image sensor, or any other input device. In one embodiment, the input device 728 may be configured to provide the pupil characteristics such as the diameter, orientation, and position, to the processor 714. In one embodiment, the input device 728 may also receive communications from other pinlight see-through near-eye displays 500 (i.e., pinlight eyeglasses) in the environment, for example, when multiple users of pinlight see-through near-eye displays 500 are nearby.

As illustrated in FIG. 7, computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In one example, databases 740 may be stored in primary storage device 732. Databases 740 may represent portions of a single database or computing device or it may represent multiple databases or computing devices. For example, databases 740 may represent (be stored on) a portion of computing system 710. Alternatively, databases 740 may represent (be stored on) one or more physically separate devices capable of being accessed by a computing device, such as computing system 710.

Continuing with reference to FIG. 7, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be separate devices accessed through other interface systems.

Many other devices or subsystems may be connected to computing system 710. Conversely, all of the components and devices illustrated in FIG. 7 need not be present to practice the embodiments described herein. The devices and subsystems referenced above may also be interconnected in different ways from that shown in FIG. 7. Computing system 710 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of the example embodiments described and/or illustrated herein. Additionally or alternatively, the example embodiments described and/or illustrated herein may be implemented in firmware and/or hardware.

For example, a computer program for determining an image and/or a mask to be encoded in a near-eye display layer 515 based on a target image 525 may be stored on the computer-readable medium and then stored in system memory 716 and/or various portions of storage devices 732 and 733. When executed by the processor 714, the computer program may cause the processor 714 to perform and/or be a means for performing the functions required for carrying out the determination of an image and/or the mask encoding different attenuation patterns discussed above.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:
1. A method, comprising:
  generating, by an array of pinlights positioned between a near focus plane and a pupil of a user, light cones configured to substantially fill a field-of-view of the pupil;

determining overlap regions where two or more light cones, each having a shape and size, intersect at a display layer positioned between the array of pinlights and the pupil; and modulating at least one of the shape and the size of the two or more light cones to reduce or eliminate the overlap regions and produce a target image that is perceived by the user to be at or further from the pupil than the near focus plane.

2. The method of claim 1, wherein the modulating comprises generating a mask configured to modulate the at least one of the shape and the size of the two or more light cones to project at least one of a modified shape through the display layer or a different size of a circular shape through the display layer.

3. The method of claim 2, wherein a transparency of the mask across the modified shape varies based on a radiometric intensity of at least one pinlight within the array of pinlights.

4. The method of claim 2, wherein the display layer encodes the mask.

5. The method of claim 1, wherein the display layer encodes an image corresponding to the target image.

6. The method of claim 1, further comprising turning on one or more pinlights within different portions of the pinlight array at different times to produce a first set of non-overlapping light cones and a second set of non-overlapping light cones.

7. The method of claim 6, wherein positions of the pinlights are changed at different times to produce a first set of non-overlapping light cones and a second set of non-overlapping light cones.

8. The method of claim 6, wherein apertures defined by a mask are changed at different times to produce a first set of non-overlapping light cones and a second set of non-overlapping light cones.

9. The method of claim 1, further comprising closing a shutter configured to prevent light from an environment from passing through the display layer to the pupil when at least one pinlight in the array of pinlights is turned on.

10. The method of claim 9, further comprising adjusting a duty cycle controlling when the shutter is opened and closed based on a diameter of the pupil.

11. The method of claim 1, further comprising computing the overlap regions based on a characteristic of the pupil, wherein the characteristic is one of a diameter of the pupil, a gaze direction of the pupil, a distance from the pupil to the display layer.

12. The method of claim 1, wherein the modulating comprises generating a mask configured to modulate at least one of the shape and the size of the two or more light cones to produce colors of the target image.

13. The method of claim 1, wherein the modulating comprises modifying the shape of the two or more light cones at the display layer based on eye tracking information.

14. The method of claim 13, wherein the modulating comprises modifying the shape of the two or more light cones to abut without overlapping at the display layer.

15. The method of claim 13, wherein the modulating comprises modifying the shape of the two or more light cones to abut without overlapping at the target image or at the near focus plane.

16. The method of claim 1, further comprising computing the overlap regions based on a characteristic of the display layer, wherein the characteristic is one of a spacing between pinlights and a distance between the pinlights and the display layer.

17. A system comprising:
an array of pinlights positioned between a near focus plane and a pupil of a user, the array of pinlights configured to generate light cones that substantially fill a field-of-view of the pupil; and
a display layer positioned between the array of pinlights and the pupil, and a processor, wherein said processor determines overlap regions where two or more light cones, each having a shape and size, intersect at the display layer, and
the display layer is configured to modulate at least one of the shape and the size of the two or more light cones to reduce or eliminate the overlap regions and produce a target image that is perceived by the user to be at or further from the pupil than the near focus plane.

18. A non-transitory computer-readable storage medium storing instructions that, when executed by a processor, causes the processor to perform steps comprising:
generating, by an array of pinlights positioned between a near focus plane and a pupil of a user, light cones configured to substantially fill a field-of-view of the pupil;
determining overlap regions where two or more light cones, each having a shape and size, intersect at a display layer positioned between the array of pinlights and the pupil; and
modulating at least one of the shape and the size of the two or more light cones to reduce or eliminate the overlap regions and produce a target image that is perceived by the user to be at or further from the pupil than the near focus plane.

* * * * *